(12) United States Patent  
Berardi

(10) Patent No.: US 6,499,410 B1  
(45) Date of Patent: Dec. 31, 2002

(54) CROSSOVER/PROTECTOR WITH WARNING LIGHT

(75) Inventor: Philip N. Berardi, Westlake Village, CA (US)

(73) Assignee: Industry Advanced Technologies, Thousand Oaks, CA (US)

( * ) Notice: Subject to any disclaimer, the term of this patent is extended or adjusted under 35 U.S.C. 154(b) by 57 days.

(21) Appl. No.: 09/721,791

(22) Filed: Nov. 22, 2000

Related U.S. Application Data

(60) Provisional application No. 60/213,951, filed on Jun. 21, 2000.

(51) Int. Cl.[7] .................................................. E01B 7/28
(52) U.S. Cl. ........................................................ 104/275
(58) Field of Search ............................... 104/275, 277, 104/279, 295; 174/97; 116/200, 202; 362/555, 559, 31, 249

(56) References Cited

U.S. PATENT DOCUMENTS

| | | | |
|---|---|---|---|
| 1,838,746 A | | 12/1931 | Day |
| 2,150,591 A | | 3/1939 | Taylor |
| 2,166,516 A | * | 7/1939 | Bainbridge ................. 104/275 |
| 2,299,356 A | * | 10/1942 | Strohm et al. ............. 104/275 |
| 3,118,017 A | * | 1/1964 | Wimbish .................... 104/275 |
| 3,357,370 A | | 12/1967 | Walkey |
| 3,888,186 A | * | 6/1975 | Jentzsch et al. ............ 104/275 |
| 3,965,967 A | * | 6/1976 | Jentzsch et al. ............ 104/275 |
| 4,067,258 A | | 1/1978 | Valeri |
| 4,693,184 A | * | 9/1987 | Peterman ................... 104/295 |
| 5,095,822 A | * | 3/1992 | Martin ....................... 104/275 |
| 5,724,909 A | * | 3/1998 | Pitman et al. ............. 362/559 |
| 5,777,266 A | * | 7/1998 | Herman et al. ............ 104/275 |
| 5,785,404 A | * | 7/1998 | Wiese ........................ 362/555 |
| 6,231,206 B1 | * | 5/2001 | Hervey et al. ............. 362/559 |
| 6,270,236 B1 | * | 8/2001 | Brussog ..................... 362/249 |

* cited by examiner

Primary Examiner—S. Joseph Morano  
Assistant Examiner—Lars A. Olson  
(74) Attorney, Agent, or Firm—Townsend and Townsend and Crew LLP

(57) ABSTRACT

A cable crossover/protector that comprises illumination as an integral part of its structure to warn of its presence. The crossover/protector may include an element to sense when current is being carried by the cables it is protecting to activate the illumination.

28 Claims, 4 Drawing Sheets

CROSSOVER/PROTECTOR WITH WARNING LIGHT

This application claims benefit of Provisional application No. 60/213,951 filed Jun. 21, 2000.

BACKGROUND OF THE INVENTION

The present invention is related generally to a protective crossover unit to protect cables and the like that may need to be placed across foot and vehicular traffic, and more particularly to a protective crossover having integral illumination.

Often, at construction sites, movie film-making locations, sporting events, factories and other such venues, there is a need to extend electrical power, air and/or water lines across walkways, roads, paths, and other avenues of travel. This need poses a hazard to both those who may need to cross over such lines and to the lines themselves. This need is well known in the prior art, and there are a number of solutions, such as that apparatus taught by U.S. Pat. No. 5,095,822.

One problem with many of the prior art crossovers is the lack of warning other than the physical presence of the unit itself. Some prior art devices do suggest adding flags to the ends of their units (see e.g., U.S. Pat. Nos. 3,888,186, and 2,166,516) in order to provide an indication of the width and location of the unit, but this does nothing when ambient light is low or non-existent. One of the documents (U.S. Pat. No. 2,166,516) suggests replacing the flags with some form of illumination, but this works only if the illumination is available and there is power for it.

SUMMARY OF THE INVENTION

The present invention is a protective crossover unit for electrical cables, air lines, and other utility lines with illumination integral therewith that may lay on or across a traveled surface such as a walkway, a road, a floor (indoor or outdoor), a stage (also indoor or outdoor) or the like. The invention provides efficient and effective protection for the article over which it forms a bridge-like structure, as well as providing notice of the presence of whatever the crossover unit overlies.

Broadly, one embodiment of the invention comprises crossover unit construction having a mat-like structure with ramps formed on opposing side edges. The crossover unit includes u-shaped channels formed to receive the cables and utility lines it will protect. A cover is generally hinged to the unit at one of the group of channels that lifts to expose the channels, and closes to cover the electrical and/or utility lines placed in the channels.

The crossover unit includes illumination as a part of its construction. Preferably, the illumination is a number of light emitting diodes (LEDs) operated by an electronic circuit that is powered by a source of AC or DC power. In an alternate embodiment of the invention an electromagnetic pickup is used to provide a signal indicative of whether or not the cables laid in the channels are carrying power. The signal is used to turn on the illumination carried by the crossover unit and to possibly provide a source of power for the illumination.

Other aspects and advantages of the invention will become apparent to those skilled in this art upon a reading of the following description of the specific embodiments of the invention, which should be taken in conjunction with the accompanying drawings.

DESCRIPTION OF THE SPECIFIC EMBODIMENTS

Figure 1:
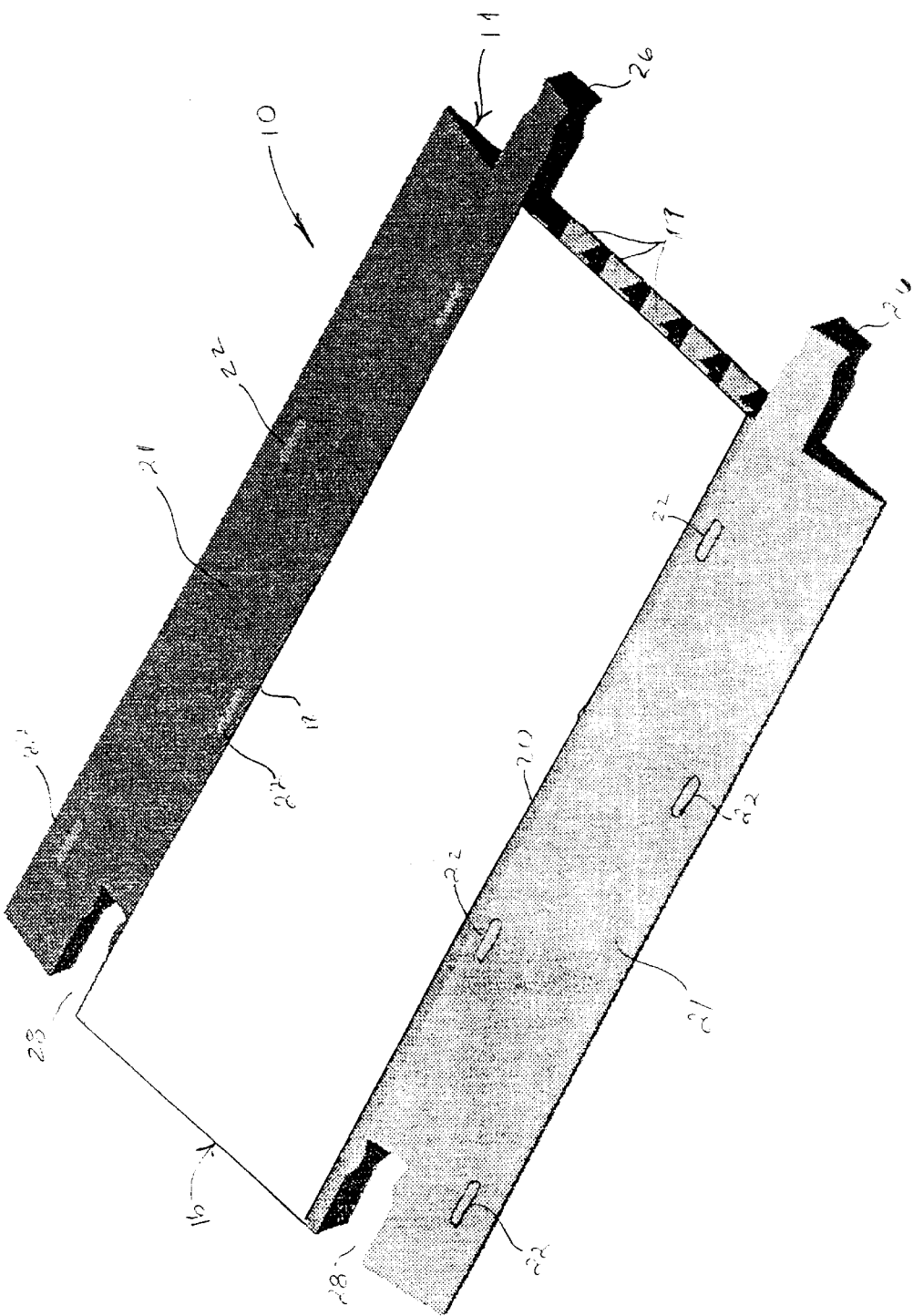
FIG. 1 is a perspective view of the protective crossover unit of the present invention.

Turning now to the figures, and for the moment FIG. 1, there is illustrated, generally identified with the reference numeral 10, a protective crossover unit constructed according to the teachings of the present invention. As FIG. 1 shows, the crossover unit 10 includes a body member 14 and a cover 16 that is preferably hingedly attached at its long side 18 to be lifted from its position shown in FIG. 1 to expose U-shaped channels 19 for receiving electrical, utility cables, gas lines, and the like.

The sides of the crossover unit 10 are configured to form ramps 21 in which are inlaid a number of illumination devices 22. Preferably, the illumination devices 22 are LEDs encapsulated in a resin or similar material, and shaped to be flush with the surface of the ramps 21. As will be seen, circuitry within the body member 14 operates to control the illumination of the LEDs.

The crossover unit 10 is constructed to form a section of a larger unit by joining them linearly together. For this purpose there is formed to extend from one end of the base member 14 a pair of attachment elements 26 configured to mateably engage and be held by similarly configured attachment slots 28 of another similarly formed crossover unit 10. Using the attachment elements 26 of one crossover unit 10 one can attach several units together to form a longer crossover system for runs of cables, utility lines, and the like.

Figure 2:
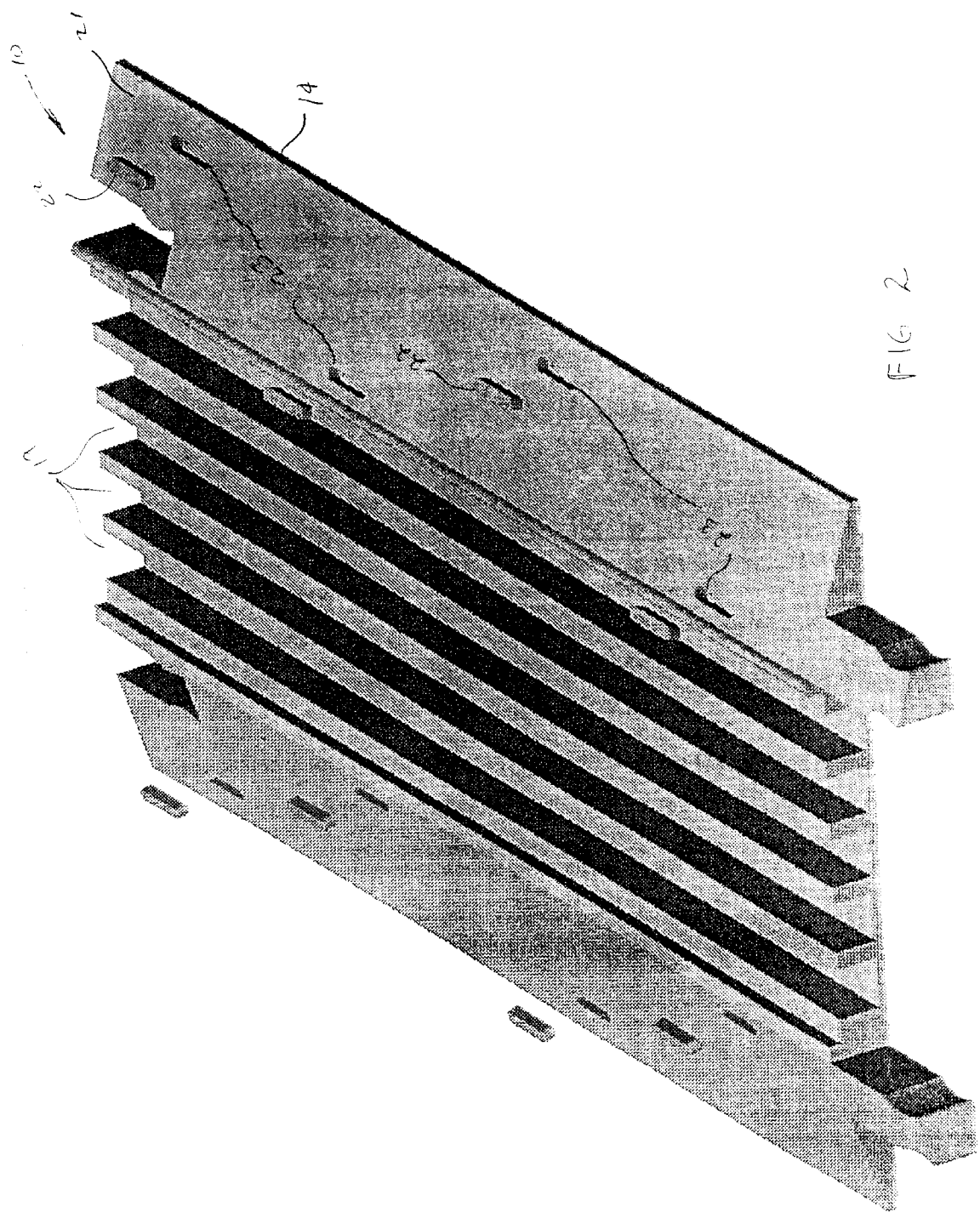
FIG. 2 is a perspective partially exploded view of the protective crossover unit of FIG. 1 with the top cover removed to show the U-shaped channels that will receive the cables and showing the encapsulated LEDs and the recesses formed to receive them.

Turning now to FIG. 2, the crossover unit 10 is shown with the cover 16 removed to show the U-shaped channels 19 used to receive and contain the cables and lines to be protected. FIG. 2 also shows the encapsulated LEDs used and the illumination devices 22 and the recesses 23 formed in the ramp portions 21 of the body member 14. (Not shown to keep from unduly complicating the Figure, is the wiring used to connect the LEDs to a source of electrical power.)

Figure 3:
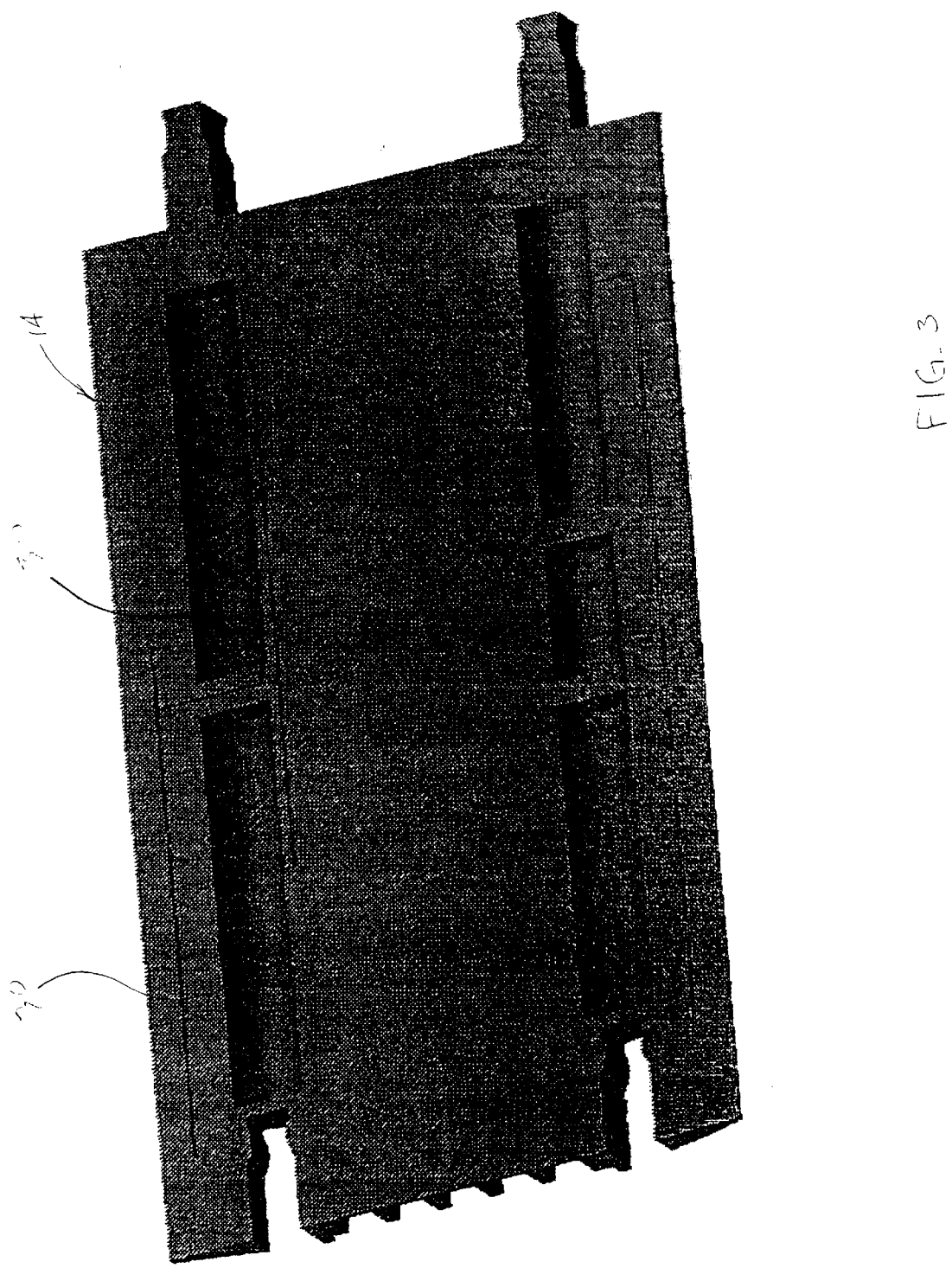
FIG. 3 is another perspective view of the protective crossover unit of FIG. 1, showing the recesses formed in the underside thereof.

FIG. 3 shows the underside of the body member 14, showing recesses 30 formed therein. The recesses may be used to house circuitry, power conversion apparatus, batteries, and other elements as may be needed to operate and/or control the illumination devices 22.

Figure 4:
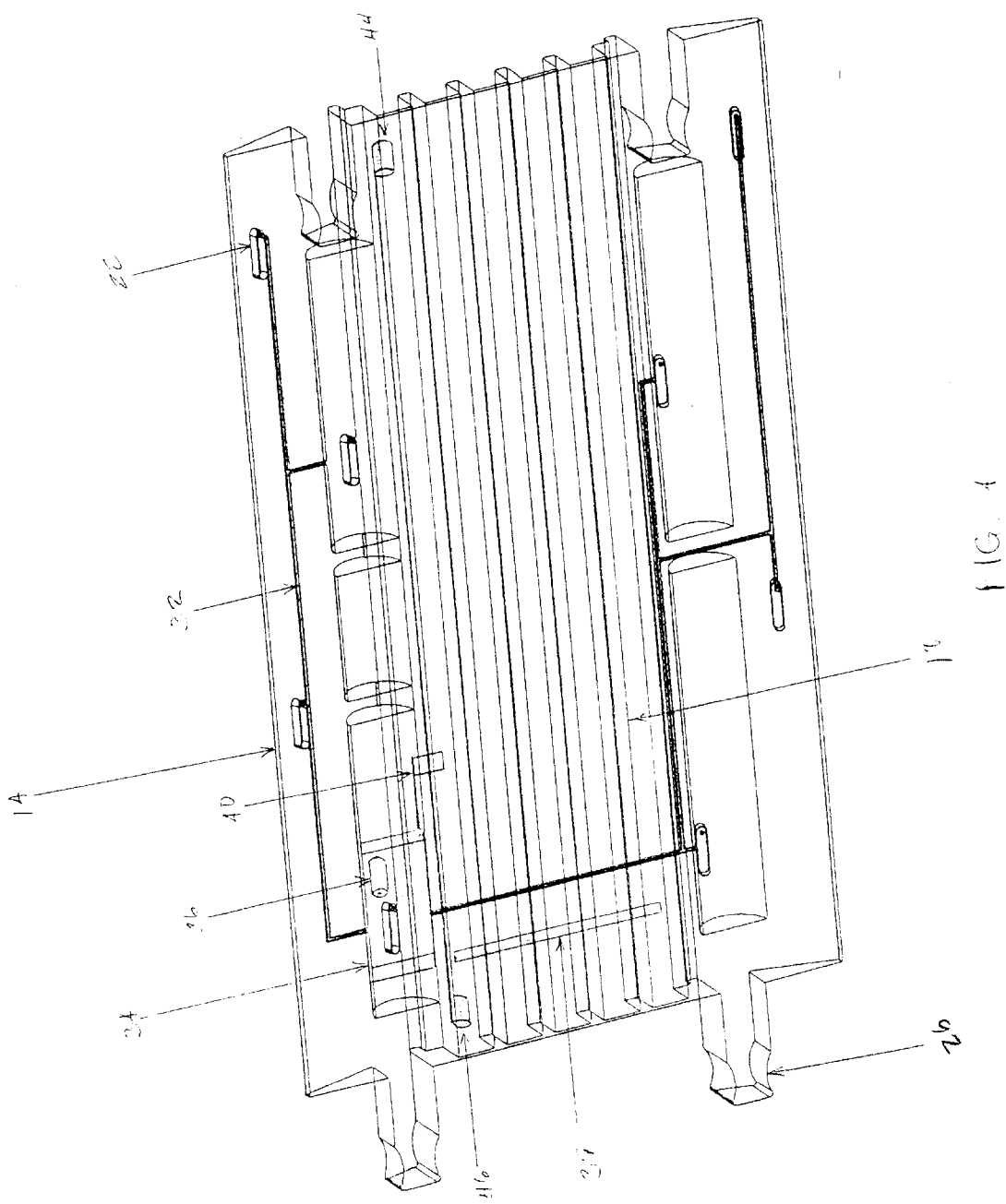
FIG. 4 is a view of the crossover unit of the present invention, partly in phantom, illustrating certain of the electrical aspects of the invention.

FIG. 4 is a view of the crossover unit 10 in partial phantom to illustrate the electrical circuitry and other apparatus housed in the body member 14 and used for operation of the illumination devices 22. Shown is the electrical wiring 32 used to connect the illumination devices 22 and the electronic control circuitry 34. Associated with the control circuitry 34 is a battery 36 which could be the sole source of power for the illumination devices. Power to the illumination devices may be switched by a rocker switch 40 situated in one of the channels 19. Alternatively, a plunger switch may be placed on the body member 14 to close when the cover 16 (FIG. 1) is closed over the channels 19 and the cables it may contain, to thereby close or complete an electrical circuit that applies power to the illumination devices 22. Another alternative could be to use a Hall effect switch, a Reed switch, or other type sensing device that would sense closure of the cover 16 to switch power to the illumination devices 22. Yet another alternative is a photo-diode that would be placed to sense the darkening of the day to switch power to the illumination devices when the ambient light drops to some predetermined level.

FIG. 4 also shows an electromagnetic strip 38 (or other current sensing device) placed to underlie or otherwise be in close proximity with any electrical cables held within the channels 19. The electromagnetic strip 38 then operates to sense when electrical current is being carried by the electrical cables in the channels 19 for activating the illumination devices 22. Circuitry in the control circuity 34 would receive a presence-of-current indication provided by the electromagnetic strip 38, and respond thereto to apply power to the illumination devices 22. The electromagnetic strip may also be constructed to draw electrical power from the electrical cables by induction, as described more fully below.

Also shown in FIG. 4 are female and male connector parts 44, 46, respectively, for AC power connections. Preferably, the connectors are conventional U-ground plugs (male and female). In use, the crossover units 10 would be connected together as described above, using as many individual ones of the units interconnected as needed. When so connected, an end one of the units would connect to an extension power cord (not shown) via its male connector 44 with the female end of the power cord, in turn, connecting to an AC or DC source. The female connector 46 would connect to a male connector 44 of an adjoining unit 10 thereby supplying AC power to it. The remaining units would be similarly connected so that all are supplied with the AC or DC power.

As indicated above, the illumination devices 22 are preferably encapsulated LEDs for the reason that LEDs available today provide efficient lighting with little power consumption. When encapsulated, they are durable and virtually indestructible. However, it will be evident to those skilled in this art that other types of illumination devices may be used, such as halogen, incandescent, fiber optics, or illumination devices that use ballast adapters, converters or other power conversion apparatus such as neon lighting devices, electroluminescent lighting or fluorescent lighting.

In an alternate embodiment of the invention, two or more LEDs are included in each encapsulation of the illumination devices 22. The LEDs would be of different colors, and separately activatable so that one or another of the LEDs would light. Further, the LEDs may be activated by a switch located on the crossover unit 10, or by remote control, using a hand held transmitter of one type or another. For example, an amber and a red colored LED may be included in the encapsulation of each of the illumination devices 22. The amber LED would be activated to bring attention to the crossover unit 10, indicating that caution should be used in the vicinity. Then, to signal a different condition of one sort or another, the amber colored LED of the illumination devices 22 would have power switched from them to the associated red colored LED. Of course, control over which colored LED is selected to be powered is made by the control circuit 34 in response to either a manual switch selection or, as indicated, a remote signal.

An alternative to using the two separate LEDs, one amber, one red, is to use conventional bi-colored red and amber LEDs or any other color combination that may suit the situation. Also, the LEDs can be located to spell a word (e.g., "caution"); an array of LEDs may be used with appropriate electronics to selectively activate predetermined ones of the LEDs to spell one or another of a number of words.

Preferably, the body member 14 is made of a hard rubber material, while the cover 16 is a hard plastic or similar material, although either could be made of any material sufficiently sturdy for the intended use. Also, the illumination devices could be controlled or otherwise manipulated to flash or chase in various in sequences to draw attention to the presence of protective crossover unit 10—particularly in low light situations.

Although a full and complete disclosure of the invention has been made, it will be evident to those skilled in this art that various modifications and alterations are possible. For example, the cover 16 need not necessarily be hingedly attached to the base member 14. Rather, it could be configured to be set in place or to be slid into place, using appropriately configured grooves formed in the base member 14. Further, the battery 36 could be used as a battery backup with supplied AC or DC power in the event the AC or DC is lost or not available. An on-board battery charger may be incorporated to charge the battery from the available AC or DC power. Also, solar power can be used to power the LEDs of the illumination devices 22 and to charge the battery 36.

In addition, electroluminescent panels may be used in place of the LEDs. The panels would be placed so as to be flush in the ramp portions 21, and the ramp portions could be configured to receive overlays that would be backlit by the electroluminescent panels. The overlays could carry warnings, such as "caution," either in negative or positive letters. Further, the cover 16 may be constructed to carry LEDs or an electroluminescent panel in addition to, or instead of, those carried by the ramp portions 21. The cover 16 may also be formed to contain the operating electronics (e.g., the electromagnetic 38 or other sensing device etc.). Finally, the body member 14 is shown with upward opening U-shaped channels 19. The channels could be downward-facing so that the body member merely need be placed over cables lying on a ground surface, in effect, forming a protective bridge that both protects and serves notice of the presence of what is bridged by the invention.

What is claimed is:

1. A protective crossover unit for a utility line laying on a traveled surface, comprising
    a body member having a pair of opposed ramp portions constructed to form a protective bridge for the utility line, each of the ramp portions having inclined surfaces; and
    an electrically powered illumination element formed in the body member operating to indicate presence of the crossover unit when illuminated.

2. The crossover unit of claim 1, wherein the utility line is a power line, the crossover unit including a sense element situated to sense the presence of electrical current in the power line to activate the illumination element.

3. The crossover unit of claim 1, the body member having a channel formed therein between the ramp portions to receive the utility line, and a cover configured to overlie the channel.

4. The crossover unit of claim 1, wherein the cover is hingedly connected to the body member.

5. The crossover unit of claim 1, wherein the illumination element includes a plurality of light emitting diodes (LEDs).

6. The crossover unit of claim 5, wherein at least a first number of the plurality of light emitting diodes are situated in the ramp portions.

7. The crossover unit of claim 1, wherein the illumination element is a plurality of LED pairs, each of the LED pairs displaying a color different from that of the other of the LED pairs when activated.

8. The crossover unit of claim 1, wherein the illumination element is a plurality of bi-colored LEDs.

9. The crossover unit of claim 2, wherein the sense element is an Electro-magnetic sensor.

10. The crossover unit of claim 1, wherein the body member has opposing end portions formed and configured to engage end portions of other crossover units for an end-to-end formation of crossover units.

11. The crossover unit of claim 3, including a switch having a first switch position for applying electrical power to the crossover unit and a second switch position for withholding electrical power from the crossover unit.

12. The crossover unit of claim 11, wherein the switch is located to detect presence of the cover overlying the channel.

13. The crossover unit of claim 12, wherein the switch is a rocker switch.

14. The crossover unit of claim 3, including a switch in the form of a Hall effect device to sense presence of the cover in its overlying position to apply electrical power to the illumination element.

15. A crossover unit for overlaying at least portions of utility lines, including electrical lines, water lines, and gas lines, comprising a body member having at least one channel formed to receive a utility line, the body member having a pair of opposed ramp portions adjacent the channel, each of the ramp porions having inclined surfaces;

a cover element adapted to overlay the channel;

an electrical illumination element formed in the body member operating to indicate presence of the cable protector when illuminated.

16. The crossover unit of claim 15, including a switch element for activating the illumination element.

17. The crossover unit of claim 16, wherein the switch element is a rocker switch.

18. The crossover unit of claim 16, wherein the switch element includes an electro-magnetic sensing element to sense electrical current in the cable received by the channel.

19. The crossover unit of claim 15, wherein the body member includes opposing ends shaped and configured to engaging matching ends of another cable protector to join them together.

20. The cable protector of claim 15, wherein the illumination element is a plurality of light-emitting diodes.

21. The cable protector of claim 15, wherein the illumination element includes a plurality of light-emitting diode pairs, each of the diode pairs displaying a color different from that of the other pair when illuminated.

22. The cable protector of claim 21, wherein the each of the light-emitting diode pairs is capable of alternately displaying a red color or an amber color when activated.

23. A protective crossover unit for a utility line laying on a traveled surface, comprising a body member having a pair of opposed ramp portions constructed to form a protective bridge for the utility line, each of the ramp portions having inclined surfaces;

an illumination element formed in the body member operating to indicate presence of the crossover unit when illuminated; and a switch having a first switch position for applying electrical power to the illumination element and a second switch position for withholding electrical power from the crossover unit.

24. A protective crossover unit for a power line laying on a traveled surface, comprising a body member having a pair of opposed ramp portions constructed to form a protective bridge for the utility line, each of the ramp portions having inclined surfaces;

an illumination element formed in the body member operating to indicate presence of the crossover unit when illuminated; and a sense element situated to sense the presence of electrical current in the power line to activate the illumination element.

25. A protective crossover unit for a power line laying on a traveled surface, comprising a body member having a pair of opposed ramp portions constructed to form a protective bridge for the utility line, each of the ramp portions having inclined surfaces;

a plurality of bi-colored LEDs mounted in the body member and operating to indicate presence of the crossover unit when illuminated.

26. A protective crossover unit for a utility line laying on a traveled surface, comprising a body member having a pair of opposed ramp portions constructed to form a protective bridge for the utility line, each of the ramp portions having inclined surfaces;

an illumination element mounted in the body member operating to indicate presence of the crossover unit when illuminated; and an electronic circuit contained in the body member for selectively communicating electrical power to the illumination element for producing illumination therefrom.

27. The crossover unit of claim 26, wherein the electronic circuit includes a source of the electrical power.

28. The crossover unit of claim 27, wherein the source is a battery.

* * * * *